(No Model.)
A. DIAMANTIDI.
DRAFT GEAR.
No. 604,735. Patented May 31, 1898.
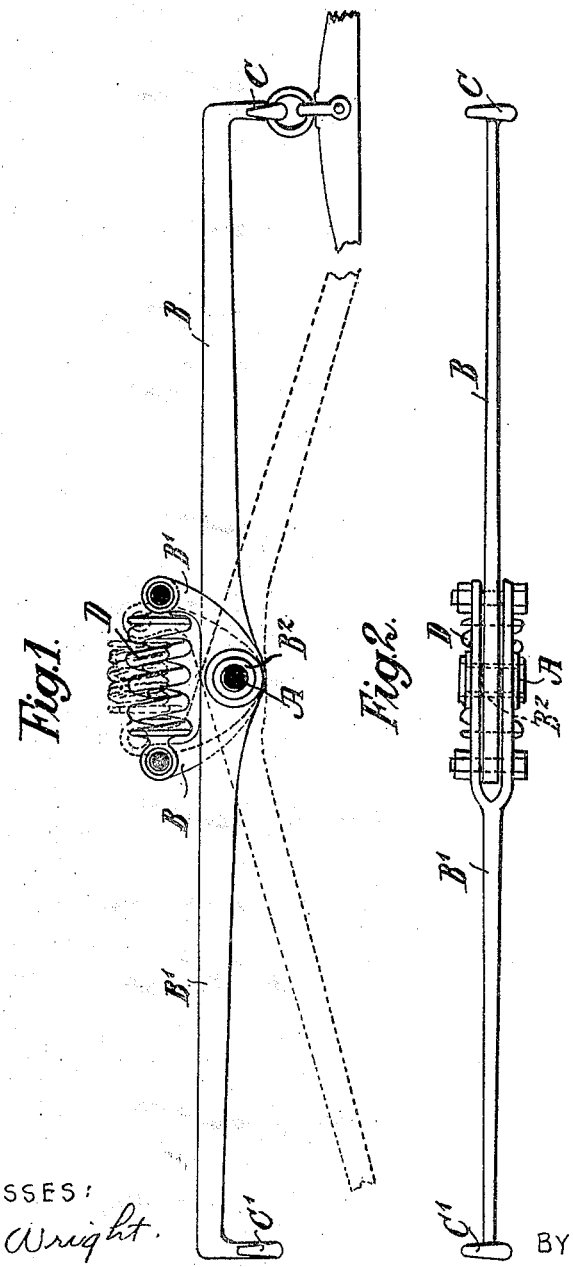
Witnesses:
F. W. Wright.
S. C. Conner
Inventor
Alexander Diamantidi
By
Howson and Howson
His Attorneys

UNITED STATES PATENT OFFICE.

ALEXANDER DIAMANTIDI, OF FREILAND, AUSTRIA-HUNGARY.

DRAFT-GEAR.

SPECIFICATION forming part of Letters Patent No. 604,735, dated May 31, 1898.

Application filed December 21, 1897. Serial No. 662,852. (No model.)

*To all whom it may concern:*

Be it known that I, ALEXANDER DIAMANTIDI, manufacturer, a subject of the Emperor of Austria-Hungary, residing at Freiland, Lower Austria, Empire of Austria-Hungary, have invented Improvements in Draft-Gears, of which the following is a specification.

My invention relates to draft-gears for carriages drawn by animals, and has for its object to so construct the draft-gear as to enable the animals to start the carriage easily and without undue effort.

In the accompanying drawings, Figure 1 is a plan, and Fig. 2 a front elevation, of my improved draft-gear.

A is a vertical bolt secured to the carriage-frame.

B B' are two horizontal bell-crank levers fulcrumed on the bolt A and crossing each other like the two halves of a pair of scissors. To the outer ends of such levers the singletrees or traces are secured.

D is a powerful spring arranged between the rearwardly-bent ends of the short arms of the levers.

When the carriage has to be started, the levers B B' are in the first place turned around the bolt A by the draft exerted by the animals or team, as indicated by dotted lines in Fig. 1, whereby the spring D is compressed, and in this way the animals have to overcome a gradually-increasing resistance, which greatly facilitates the starting of the carriage and notably relieves the animal or team.

One of the levers—viz., B'—is forked and has secured in it a sleeve $B^2$, on which the other lever turns, and this sleeve is fitted on the bolt A.

My improved draft-gear differs from the known elastic draft-gears by the following features: The spring is arranged on the rear side of the levers B B', where there is sufficient place for it and where it does not interfere with the free movement of the animal or team. The spring is arranged transversely to the direction of the draft. It acts by compression and has a comparatively large play.

I claim—

A draft-gear comprising a vertical bolt secured to the carriage-frame, a pair of horizontal bell-crank levers fulcrumed on such bolt and crossing each other like the halves of a pair of scissors and having their inner short arms bent rearwardly, a spring arranged between the ends of the inner short arms of such levers and adapted to be compressed on turning forward the outer ends of the long arms of such levers and means for connecting the outer ends of the long arms of such levers with the harness of the animal or team.

In testimony whereof I have signed my name to this specification in the presence of two subscribing witnesses.

ALEXANDER DIAMANTIDI.

Witnesses:
HENRY C. CARPENTER,
CHAS. E. CARPENTER.